Thornton & Latta,
Hames.
No. 113,945. Patented Apr. 18, 1871.

Witnesses:
C. C. Wilson
W. H. Henderson

Inventors:
James Thornton
and
E. G. Latta,
by Geo. W. Rothwell
Atty

United States Patent Office.

JAMES THORNTON AND EMMIT G. LATTA, OF WELLSVILLE, NEW YORK, ASSIGNORS TO JAMES THORNTON AND JAMES MACKEN, OF SAME PLACE.

Letters Patent No. 113,945, dated April 18, 1871.

IMPROVEMENT IN HAMES FOR HARNESS.

The Schedule referred to in these Letters Patent and making part of the same.

*To all whom it may concern:*

Be it known that we, JAMES THORNTON and EMMIT G. LATTA, both of Wellsville, in the county of Allegany and State of New York, have invented a new and useful Improvement in Hames for Harness; and we do hereby declare the following to be a full, clear, and exact description thereof sufficient to enable those skilled in the art to which our invention appertains to fully understand and to make and use the same, reference being had to the accompanying drawing forming part of this specification, and in which—

Figure 1:
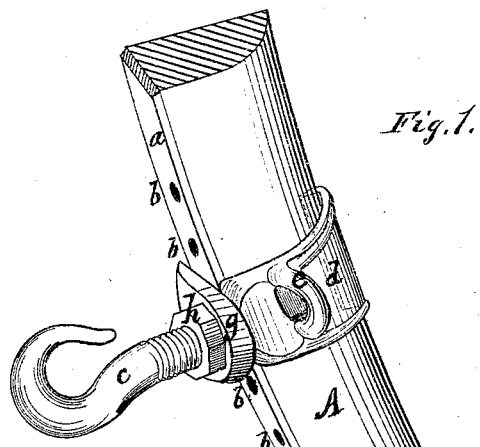
Figure 2:
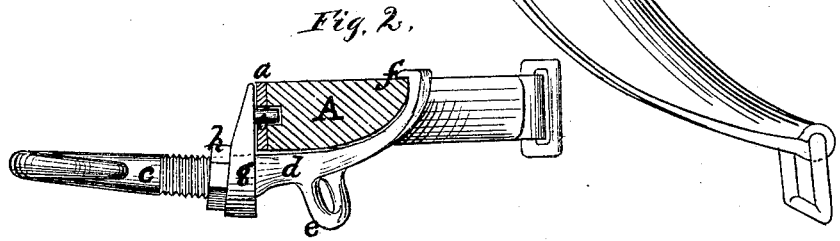

Figure 1 is a perspective view showing a part of a hame with our improvement applied thereto: and Figure 2 is a transverse section of the same.

Our invention is principally intended for draft-hames, the object being to dispense with holes in or through the wood for the adjustment of the draft attachment, and thereby avoid the liability of fracture, the locality where breakage usually occurs in draft-hames being at or near one of the holes through the wood.

The present invention consists in the construction of the draft-hook with a curved and flanged plate, on which the breast-strap staple is formed, said plate fitting around the hame, and being secured thereto by a separate plate and nut screwed onto the threaded shank of the hook, the separate or loose plate having a projection which enters any one of a series of holes made in an iron strip, with which the outer face of the hame is bound, as will be hereinafter more fully described.

Referring to the accompanying drawing, in which similar letters of reference indicate like parts in the two figures, it will be observed that the outer edge or side of the hames is faced with a strip of metal, *a*. This facing may be attached to the hame A with screws or rivets.

In this metallic strip are made the holes $b\ b$, which serve for the adjustment of the draft attachment.

The draft-hook *c* is formed with a threaded shank, and with this is cast a curved, shouldered plate, *d*, conforming in shape to the rounded surface of the hame.

The plate *d* is provided with a loop or staple, *e*, for the attachment of the breast-strap, and also with a flange, *f*, which catches over the inner edge of the wood, and thus renders the hook rigid when secured.

To secure the hook we employ a separate plate, *g*, fitting loosely upon the shank *c*, and having a projection, *i*, on its inner face, which is adapted to enter either of the holes *b* in the metallic facing of the hame.

The plate *g* is tightly held in place by a nut, *h*, screwed onto the threaded shank of the hook.

The hook is readily applied and detached, and to adjust it it is only necessary to loosen the nut until the plate *g* can be disengaged and then move the hook to the desired point, where it is fixed by entering the projection and tightening the nut.

The simple construction of parts and the dispensing with holes in the wood, whereby the strength of the hames is left unimpaired, constitute the principal advantages of our invention.

Having thus described our invention,

What we claim as new, and desire to secure by Letters Patent, is—

In combination with a hame, A, having a series of holes in its outer edge, a draft-hook, *c*, formed with a threaded shank, and with the flanged plate $d\ f$, a plate, *g*, provided with a projection, *i*, and a nut, *h*, all constructed and operating substantially as herein described.

To the above specification of our invention we have signed our names this 4th day of March, 1871, in the presence of the two subscribing witnesses.

JAMES THORNTON.
EMMIT G. LATTA.

Witnesses:
DWIGHT GOODRICH,
E. B. JUDD.